(12) United States Patent
Zhu et al.

(10) Patent No.: US 11,022,423 B2
(45) Date of Patent: Jun. 1, 2021

(54) METHOD FOR CALIBRATING AN ERROR OF INSTALLATION OF AN INTERFEROMETER IN A MULTI-AXIS LASER DISPLACEMENT MEASUREMENT SYSTEM

(71) Applicant: TSINGHUA UNIVERSITY, Beijing (CN)

(72) Inventors: Yu Zhu, Beijing (CN); Jinchun Hu, Beijing (CN); Shengwu Du, Beijing (CN); Enyao Shang, Beijing (CN); Ming Zhang, Beijing (CN); Wensheng Yin, Beijing (CN); Kaiming Yang, Beijing (CN); Rong Cheng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 16/759,294

(22) PCT Filed: Oct. 25, 2018

(86) PCT No.: PCT/CN2018/111800
§ 371 (c)(1),
(2) Date: Apr. 24, 2020

(87) PCT Pub. No.: WO2019/080888
PCT Pub. Date: May 2, 2019

(65) Prior Publication Data
US 2021/0033383 A1    Feb. 4, 2021

(30) Foreign Application Priority Data

Oct. 26, 2017 (CN) .......................... 201711013864.7

(51) Int. Cl.
*G01B 9/02* (2006.01)
*G01B 11/02* (2006.01)

(52) U.S. Cl.
CPC .......... *G01B 9/02072* (2013.04); *G01B 9/02* (2013.01); *G01B 9/02027* (2013.01); *G01B 11/02* (2013.01); *G01B 2290/70* (2013.01)

(58) Field of Classification Search
CPC .. G01B 9/02; G01B 9/02027; G01B 9/02072; G01B 11/02
See application file for complete search history.

(56) References Cited

U.S. PATENT DOCUMENTS

| 5,341,702 A | 8/1994 | Chaney et al. |
| 5,757,160 A * | 5/1998 | Kreuzer .............. G03F 7/70716 318/649 |

(Continued)

FOREIGN PATENT DOCUMENTS

| CN | 103499292 A | 1/2014 |
| CN | 103528500 A | 1/2014 |

(Continued)

OTHER PUBLICATIONS

International Search Report from International Application No. PCT/CN2018/111800 dated Jan. 30, 2019.

*Primary Examiner* — Michael A Lyons
(74) *Attorney, Agent, or Firm* — Brundidge & Stanger, P.C.

(57) ABSTRACT

Provided is a method for calibrating an error of installation of an interferometer in a multi-axis laser displacement measurement system, including: adding one or more redundant interferometers in a laser interferometer displacement measurement system; then establishing displacement calculating equations containing installation error of the laser interferometer and obtaining redundant measurement information by continuously measuring displacement informa- (Continued)

tion of multiple points, wherein the number of the combined displacement calculating equations is equal to the number of unknown quantities; and further solving the equation set to obtain the installation error of the interferometer. With a redundant arrangement of the laser interferometer, self-calibration of the installation error thereof can be achieved. A problem of difficulty in calibration of the installation error of the multi-axis interferometer in industrial application can be solved without assistance of other displacement sensors with higher precision.

2 Claims, 2 Drawing Sheets

(56) References Cited

U.S. PATENT DOCUMENTS

| | | | |
|---|---|---|---|
| 5,790,253 A * | 8/1998 | Kamiya | G03F 7/70691 356/400 |
| 6,813,022 B2 * | 11/2004 | Inoue | G03F 7/70691 356/138 |
| 7,274,462 B2 * | 9/2007 | Hill | G01B 11/02 356/500 |
| 7,489,407 B2 * | 2/2009 | Hill | G03F 7/70775 356/508 |
| 2003/0133125 A1 * | 7/2003 | Hattori | G01B 9/02027 356/500 |
| 2008/0049211 A1 | 2/2008 | Ueshima et al. | |
| 2008/0291464 A1 * | 11/2008 | Sogard | G01B 9/02027 356/500 |
| 2010/0020330 A1 | 1/2010 | Owen | |

FOREIGN PATENT DOCUMENTS

| | | |
|---|---|---|
| CN | 104297718 A | 1/2015 |
| CN | 106154753 A | 11/2016 |
| CN | 106154762 A | 11/2016 |
| CN | 107560553 A | 1/2018 |

* cited by examiner

METHOD FOR CALIBRATING AN ERROR OF INSTALLATION OF AN INTERFEROMETER IN A MULTI-AXIS LASER DISPLACEMENT MEASUREMENT SYSTEM

CROSS-REFERENCE TO RELATED PATENT APPLICATION

This is a US National Phase of application No. PCT/CN2018/111800, filed on Oct. 25, 2018, which claims the benefit of the Chinese Patent Application No. 201711013864.7, filed on Oct. 26, 2017, the disclosure of which is incorporated herein by reference in its entirety.

BACKGROUND OF THE INVENTION

1. Field

The present disclosure relates to a method for calibrating an error of installation of an interferometer in a multi-axis laser displacement measurement system, which may be applied to installation error calibration of a measurement axis of a multi-axis laser interferometer three-degree-of-freedom displacement measurement system in a precision motion stage.

2. Description of the Related Art

A laser interferometer has the advantages of high measurement resolution, high accuracy, large measuring stroke, etc. In the field of precision manufacturing, it is widely used in multi-degree-of-freedom precision motion displacement measurement systems required for nanometer or sub-nanometer level measurement resolution, which has been attracting attentions of both academia and industry.

A measuring system using the laser interferometer includes a laser generator (light source), a lens, a mirror, a photoelectric converter, and a data acquisition card. Due to an installation error of the interferometer during the installation process, the axis of laser beam cannot be parallel to a moving direction of a motion stage. The measurement error caused by the installation error may have a relatively large impact on the laser interferometer measurement system required for nanometer and sub-nanometer level accuracy. At present, other auxiliary sensors are often used in industrial application to calibrate the installation error, and the calibration process is complicated.

Therefore, a method that can simply and effectively calibrate the installation error of the laser interferometer displacement measurement system without assistance of other auxiliary sensors is urgently needed.

SUMMARY OF THE INVENTION

The present disclosure is directed to providing a method for implementing a calibration of a installation error of a multi-axis laser interferometer in a multi-axis laser displacement measurement system by adding a redundant interferometer, thereby solving a problem of difficult in calibration of the installation error of the interferometer.

One aspect of the present disclosure is as follows:

A method for calibrating an error of installation of an interferometer in a multi-axis laser displacement measurement system including a motion stage (1), an interferometer (301) installed in a X direction, a first interferometer (302) and a second interferometer (303) installed in a Y direction, wherein the method includes:

1) installing a redundant interferometer (4) and setting it as an installation reference axis; and establishing a coordinate system OXYZ with a geometric center of the motion stage (1) as an origin, the X axis of the coordinate system being parallel to a beam direction of the redundant interferometer (4);

2) establishing a three-degree-of-freedom displacement calculating model including installation errors of the interferometer (301) installed in the X direction, the first interferometer (302) and the second interferometer (303) installed in the Y direction, as well as a measured value of the redundant interferometer (4), the model being represented as following equations:

$$x = \frac{L_1 + L_2 a_1}{2}$$
$$y = \frac{S_1 b_1 + S_2 b_2}{2}$$
$$\theta_z = \frac{L_2 a_1 - L_1}{d}$$
$$\theta_z = \frac{S_2 b_2 - S_1 b_1}{r}$$

wherein, in the equations:

$$a_1 = \frac{1 - 2\eta_1^2}{1 - 0.5\eta_1^2}, b_1 = \frac{1 - 2\varphi_1^2}{1 - 0.5\varphi_1^2}, b_2 = \frac{1 - 2\varphi_2^2}{1 - 0.5\varphi_2^2},$$

wherein, $L_1$ is a measured value of the redundant interferometer; $L_2$ is a measured value of the interferometer installed in the X direction; $S_1$ is a measured value of the first interferometer installed in the Y direction; $S_2$ is a measured value of the second interferometer installed in the Y direction; d is an installation distance in the Y direction between the redundant interferometer and the interferometer installed in the X direction; r is an installation distance in the X direction between the first interferometer and the second interferometer installed in the Y direction; x is a displacement of the motion stage along the X axis of the coordinate system; y is a displacement of the motion stage along the Y axis of the coordinate system; $\theta_z$ is a rotational displacement of the motion stage around the Z axis of the coordinate system; $a_1$, $b_1$ and $b_2$ are intermediate variables; $\eta_1$ is an installation error angle between the interferometer installed in the X direction and the X axis of the coordinate system; $\phi_1$ is an installation error angle between the first interferometer installed in the Y direction and the Y axis of the coordinate system; and $\phi_2$ is an installation error angle between the second interferometer installed in the Y direction and the Y axis of the coordinate system;

3) continuously moving, by the motion stage (1), three points, $P1=(x^1, y^1, \theta_z^1)$, $P2=(x^2, y^2, \theta_z^2)$, and $P3=(x^3, y^3, \theta_z^3)$, wherein $x^1$, $x^2$, and $x^3$ are displacements of the points P1, P2 and P3 in the X-axis direction of the coordinate system; $y^1$, $y^2$, and $y^3$ are displacements of the points P1, P2 and P3 in the Y-axis direction of the coordinate system; and $\theta_z^1$, $\theta_z^2$, and $\theta_z^3$ are rotational displacements of the points P1, P2 and P3 around the Z-axis direction of the coordinate system; and obtaining measured values of the interferometers installed in the X and Y directions and the redundant interferometer at corresponding points, respectively, and forming an equation set as follows:

$$\begin{cases} x^1 = \frac{L_1^1 + L_2^1 a_1}{2} \\ y^1 = \frac{S_1^1 b_1 + S_2^1 b_2}{2} \\ \theta_z^1 = \frac{L_2^1 a_1 - L_1^1}{d} \\ \theta_z^1 = \frac{S_2^1 b_2 - S_1^1 b_1}{r} \end{cases} \begin{cases} x^2 = \frac{L_1^2 + L_2^2 a_1}{2} \\ y^2 = \frac{S_1^2 b_1 + S_2^2 b_2}{2} \\ \theta_z^2 = \frac{L_2^2 a_1 - L_1^2}{d} \\ \theta_z^2 = \frac{S_2^2 b_2 - S_1^2 b_1}{r} \end{cases} \begin{cases} x^3 = \frac{L_1^3 + L_2^3 a_1}{2} \\ y^3 = \frac{S_1^3 b_1 + S_2^3 b_2}{2} \\ \theta_z^3 = \frac{L_2^3 a_1 - L_1^3}{d} \\ \theta_z^3 = \frac{S_2^3 b_2 - S_1^3 b_1}{r} \end{cases}$$

wherein, $L_1^1, L_1^2, L_1^3$ are measured values of the redundant interferometer at the three points P1, P2 and P3, respectively; $L_2^1, L_2^2, L_2^3, S_1^1, S_1^2, S_1^3, S_2^1, S_2^2$ and $S_2^3$ are measured values of the interferometer installed in the X direction, and the first interferometer and the second interferometer installed in the Y direction at the three points P1, P2 and P3, respectively; and 4) solving the equation set in 3), where the measured values $L_1^1, L_1^2, L_1^3, L_2^1, L_2^2, L_2^3, S_1^1, S_1^2, S_1^3, S_2^1, S_2^2$ and $S_2^3$ of the interferometers installed in the X and Y directions and the redundant interferometer, as well as the installation distance d between the redundant interferometer and the interferometer installed in the X direction and the installation distance r between the first interferometer and the second interferometer installed in the Y direction are known quantities, to obtain the installation error angles $\eta_1$, $\phi_1$ and $\phi_2$:

$$\eta_1 = \sqrt{\frac{p_1 - 1}{0.5 p_1 - 2}}, \varphi_1 = \sqrt{\frac{q_1 - 1}{0.5 q_1 - 2}}, \varphi_2 = \sqrt{\frac{q_2 - 1}{0.5 q_2 - 2}}$$

wherein:

$$p_1 = \frac{S_2^1(S_1^2 L_1^3 - S_1^3 L_1^2) + S_2^2(S_1^3 L_1^1 - S_1^1 L_1^3) + S_2^3(S_1^1 L_1^2 - S_1^2 L_1^1)}{S_2^1(S_1^2 L_2^3 - S_1^3 L_2^2) + S_2^2(S_1^3 L_2^1 - S_1^1 L_2^3) + S_2^3(S_1^1 L_2^2 - S_1^2 L_2^1)}$$

$$q_1 = \frac{d}{r} \frac{S_2^1(L_2^3 L_1^2 - L_2^2 L_1^3) + S_2^2(L_2^1 L_1^3 - L_2^3 L_1^1) + S_2^3(L_2^2 L_1^1 - L_2^1 L_1^2)}{S_2^1(S_1^2 L_2^3 - S_1^3 L_2^2) + S_2^2(S_1^3 L_2^1 - S_1^1 L_2^3) + S_2^3(S_1^1 L_2^2 - S_1^2 L_2^1)}$$

$$q_2 = \frac{d}{r} \frac{S_1^1(L_2^3 L_1^2 - L_2^2 L_1^3) + S_1^2(L_2^1 L_1^3 - L_2^3 L_1^1) + S_1^3(L_2^2 L_1^1 - L_2^1 L_1^2)}{S_2^1(S_1^2 L_2^3 - S_1^3 L_2^2) + S_2^2(S_1^3 L_2^1 - S_1^1 L_2^3) + S_2^3(S_1^1 L_2^2 - S_1^2 L_2^1)}.$$

In the above aspect, the interferometer may be a laser interferometer.

The method for calibrating an error of installation of an interferometer in a multi-axis laser displacement measurement system provided by the present disclosure may have the following advantages and outstanding technical effects: the calibration process become simple due to use of redundant measurement information; a redundant interferometer is added to the multi-axis laser interferometer displacement measurement system, displacement information of multiple points are continuously measured, and the number of equations in the combined displacement calculating equation set is equal to the number of unknown quantities, thereby realizing the calibration of the installation error of the laser interferometer. The method is easy to be implemented in industrial application without assistance of other auxiliary displacement sensors.

Figure 1:
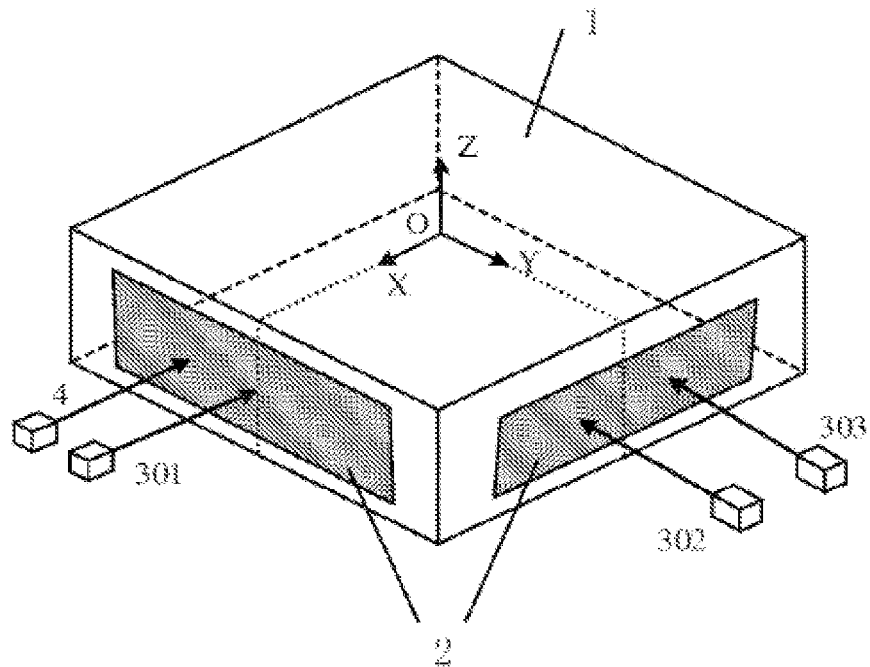
FIG. 1 is a schematic diagram of a method for calibrating an error of installation of an interferometer in a multi-axis laser displacement measurement system according to the present disclosure.

In the drawings: 1- motion stage; 2- plane mirror; 1'- motion stage after moving displacement S; S- displacement of the motion stage in a X direction; 3- uniaxial laser interferometer; 301- interferometer installed in a X direction; 302- first interferometer installed in a Y direction; 303- second interferometer installed in a Y direction; 4- additional redundant interferometer.

DETAILED DESCRIPTION OF THE EMBODIMENT

Taking a three-axis laser interferometer three-degree-of-freedom displacement measurement system in a motion stage as an example, detailed embodiments of the present disclosure will be further described in detail hereinafter with reference to the drawings.

FIG. 1 is a schematic diagram of a method for calibrating an error of installation of an interferometer in the three-axis laser displacement measurement system according to the present disclosure, which includes an interferometer 301 installed in a X direction, a first interferometer 302 and a second interferometer 303 installed in a Y direction, and an additional redundant interferometer 4.

Figure 3:
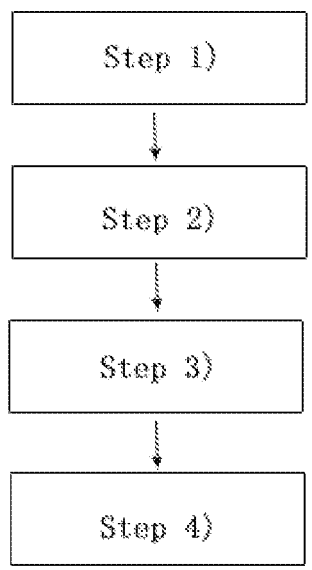
FIG. 3 is a flow chart of a method for calibrating an error of installation of an interferometer in a multi-axis laser displacement measurement system according to the present disclosure.

FIG. 3 is a flow chart of a method for calibrating an error of installation of an interferometer in a multi-axis laser displacement measurement system according to the present disclosure. The detailed implementation steps of the method are as follows:

At step 1), a redundant interferometer are installed in the three-axis laser interferometer measurement system, and it is set as an installation reference axis; then a coordinate system OXYZ with a geometric center of the motion stage as an origin O is established, the X axis of the coordinate system being parallel to a direction of laser beam of the redundant interferometer;

At step 2), a three-degree-of-freedom displacement calculating model including installation errors $\eta_1$, $\phi_1$ and $\phi_2$ of the interferometer installed in the X direction and the first interferometer and the second interferometer installed in the Y direction, as well as a measured value $L_1$ of the redundant interferometer is established, the model being represented as follows:

$$x = \frac{L_1 + L_2 a_1}{2} \quad (1)$$

$$y = \frac{S_1 b_1 + S_2 b_2}{2}$$

$$\theta_z = \frac{L_2 a_1 - L_1}{d}$$

$$\theta_z = \frac{S_2 b_2 - S_1 b_1}{r}$$

wherein in the equations:

$$a_1 = \frac{1 - 2\eta_1^2}{1 - 0.5\eta_1^2}, b_1 = \frac{1 - 2\varphi_1^2}{1 - 0.5\varphi_1^2}, b_2 = \frac{1 - 2\varphi_2^2}{1 - 0.5\varphi_2^2} \quad (2)$$

wherein, $L_1$ is the measured value of the redundant interferometer; $L_2$ is a measured value of the interferometer installed in the X direction; $S_1$ is a measured value of the first interferometer installed in the Y direction; $S_2$ is a measured value of the second interferometer installed in the Y direction; d is an installation distance in the Y direction between the redundant interferometer and the interferometer installed in the X direction; r is an installation distance in the X direction between the first interferometer and the second interferometer installed in the Y direction; x is a displacement of the motion stage along the X axis of the coordinate system; y is a displacement of the motion stage along the Y axis of the coordinate system; $\theta_z$ is a rotational displacement of the motion stage around the Z axis of the coordinate system; $a_1$, $b_1$ and $b_2$ are intermediate variables; $\eta_1$ is an installation error angle between the interferometer installed in the X direction and the X axis; $\phi_1$ is an installation error angle between the first interferometer installed in the Y direction and the Y axis; and $\phi_2$ is an installation error angle between the second interferometer installed in the Y direction and the Y axis.

Figure 2:
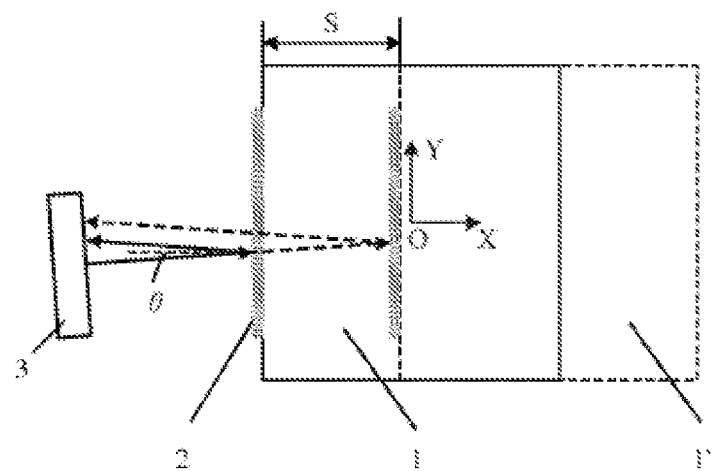
FIG. 2 is a measurement principle diagram when a uniaxial laser interferometer has an installation error.

In the equations, the intermediate variables $a_1$, $b_1$ and $b_2$ are obtained based on the analysis of the measurement results when a uniaxial laser interferometer has an installation error. FIG. 2 shows the measurement principle when the uniaxial laser interferometer has the installation error. When the installation error angle between the uniaxial laser interferometer and the X-axis of the coordinate system is set as $\theta$, after the motion stage moves a displacement S in the X direction, the relationship between a measured value R of the uniaxial interferometer and the displacement S of the motion stage is as follows:

$$S = R \frac{\cos 2\theta}{\cos \theta} \quad (3)$$

Taking a first-order Taylor approximation to $\theta$, it can be obtained that:

$$S = R \frac{\cos 2\theta}{\cos \theta} \approx R \frac{1 - 2\theta^2}{1 - 0.5\theta^2} \quad (4)$$

According to equation (4), intermediate variables $a_1$, $b_1$ and $b_2$ related to the installation error angle can be obtained.

At step 3), the motion stage continuously moves three points, $P1=(x^1, y^1, \theta_z^1)$, $P2=(x^2, y^2, \theta_z^2)$, and $P3=(x^3, y^3, \theta_z^3)$, wherein $x^1$, $x^2$, and $x^3$ are displacements of the points P1, P2 and P3 in the X-axis direction of the coordinate system; $y^1$, $y^2$, and $y^3$ are displacements of the points P1, P2 and P3 in the Y-axis direction of the coordinate system; $\theta_z^1$, $\theta_z^2$, and $\theta_z^3$ are rotational displacements of the points P1, P2 and P3 around the Z-axis direction of the coordinate system; and measured values of the interferometer installed in the X direction, the first interferometer and the second interferometer installed in the Y direction, and the redundant interferometer at corresponding points are obtained, respectively, and an equation set (5) is formed as follows:

$$\begin{cases} x^1 = \frac{L_1^1 + L_2^1 a_1}{2} \\ y^1 = \frac{S_1^1 b_1 + S_2^1 b_2}{2} \\ \theta_z^1 = \frac{L_2^1 a_1 - L_1^1}{d} \\ \theta_z^1 = \frac{S_2^1 b_2 - S_1^1 b_1}{r} \end{cases} \begin{cases} x^2 = \frac{L_1^2 + L_2^2 a_1}{2} \\ y^2 = \frac{S_1^2 b_1 + S_2^2 b_2}{2} \\ \theta_z^2 = \frac{L_2^2 a_1 - L_1^2}{d} \\ \theta_z^2 = \frac{S_2^2 b_2 - S_1^2 b_1}{r} \end{cases} \begin{cases} x^3 = \frac{L_1^3 + L_2^3 a_1}{2} \\ y^3 = \frac{S_1^3 b_1 + S_2^3 b_2}{2} \\ \theta_z^3 = \frac{L_2^3 a_1 - L_1^3}{d} \\ \theta_z^3 = \frac{S_2^3 b_2 - S_1^3 b_1}{r} \end{cases} \quad (5)$$

wherein, $L_1^1$, $L_1^2$, $L_1^3$ are measured values of the redundant interferometer at the three points P1, P2 and P3, respectively; $L_2^1$, $L_2^2$, $L_2^3$, $S_1^1$, $S_1^2$, $S_1^3$, $S_2^1$, $S_2^2$ and $S_2^3$ are measured values of the interferometer installed in the X direction, and the first interferometer and the second interferometer installed in the Y direction at the three points P1, P2 and P3, respectively;

At step 4), the equation set (5) in step 3) has twelve equations and twelve unknowns, including three installation errors $\eta_1$, $\phi_1$ and $\phi_2$ and nine displacement values $x^1$, $y^1$, $\theta_z^1$, $x^2$, $y^2$, $\theta_z^2$, $x^3$, $y^3$, $\theta_z^3$. In the equation set, the measured values $L_1^1$, $L_1^2$, $L_1^3$, $L_2^1$, $L_2^2$, $L_2^3$, $S_1^1$, $S_1^2$, $S_1^3$, $S_2^1$, $S_2^2$ and $S_2^3$ of the interferometers installed in the X and Y directions and the redundant interferometer, as well as the installation distance d between the redundant interferometer and the interferometer installed in the X direction and the installation distance r between the first interferometer and the second interferometer installed in the Y direction are known quantities, d and r are design values.

By solving the equation set (5), the installation error angles $\eta_1$, $\phi_1$ and $\phi_2$ can be obtained:

$$\eta_1 = \sqrt{\frac{p_1 - 1}{0.5 p_1 - 2}}, \varphi_1 = \sqrt{\frac{q_1 - 1}{0.5 q_1 - 2}}, \varphi_2 = \sqrt{\frac{q_2 - 1}{0.5 q_2 - 2}} \quad (6)$$

wherein:

$$p_1 = \frac{S_2^1(S_1^2 L_1^3 - S_1^3 L_1^2) + S_2^2(S_1^3 L_1^1 - S_1^1 L_1^3) + S_2^3(S_1^1 L_1^2 - S_1^2 L_1^1)}{S_2^1(S_1^2 L_2^3 - S_1^3 L_2^2) + S_2^2(S_1^3 L_2^1 - S_1^1 L_2^3) + S_2^3(S_1^1 L_2^2 - S_1^2 L_2^1)} \quad (7)$$

$$q_1 = \frac{d}{r} \frac{S_2^1(L_2^3 L_1^2 - L_2^2 L_1^3) + S_2^2(L_2^1 L_1^3 - L_2^3 L_1^1) + S_2^3(L_2^2 L_1^1 - L_2^1 L_1^2)}{S_2^1(S_1^2 L_2^3 - S_1^3 L_2^2) + S_2^2(S_1^3 L_2^1 - S_1^1 L_2^3) + S_2^3(S_1^1 L_2^2 - S_1^2 L_2^1)}$$

$$q_2 = \frac{d}{r} \frac{S_1^1(L_2^3 L_1^2 - L_2^2 L_1^3) + S_1^2(L_2^1 L_1^3 - L_2^3 L_1^1) + S_1^3(L_2^2 L_1^1 - L_2^1 L_1^2)}{S_2^1(S_1^2 L_2^3 - S_1^3 L_2^2) + S_2^2(S_1^3 L_2^1 - S_1^1 L_2^3) + S_2^3(S_1^1 L_2^2 - S_1^2 L_2^1)}.$$

Through the above steps, the installation error calibration of the three-axis laser interferometer can be achieved by simple calculation without assistance of other auxiliary displacement sensors; the method is simple and easy to be applied to industry.

What is claimed is:
1. A method for calibrating an error of installation of an interferometer in a multi-axis laser displacement measurement system, the multi-axis laser displacement measurement system comprising a motion stage, an interferometer installed in a X direction, a first interferometer and a second interferometer installed in a Y direction, wherein the method comprises:
  1) installing a redundant interferometer and setting it as an installation reference axis;
  and establishing a coordinate system OXYZ with a geometric center of the motion stage as an origin, the X axis of the coordinate system being parallel to a beam direction of the redundant interferometer;

2) establishing, by the multi-axis laser displacement measurement system, a three-degree-of-freedom displacement calculating model including installation errors of the interferometer installed in the X direction, and the first interferometer and the second interferometer installed in the Y direction, as well as a measured value of the redundant interferometer, the model being represented as following equations:

$$x = \frac{L_1 + L_2 a_1}{2}$$

$$y = \frac{S_1 b_1 + S_2 b_2}{2}$$

$$\theta_z = \frac{L_2 a_1 - L_1}{d}$$

$$\theta_z = \frac{S_2 b_2 - S_1 b_1}{r}$$

wherein, in the equations:

$$a_1 = \frac{1 - 2\eta_1^2}{1 - 0.5\eta_1^2}, \; b_1 = \frac{1 - 2\varphi_1^2}{1 - 0.5\varphi_1^2}, \; b_2 = \frac{1 - 2\varphi_2^2}{1 - 0.5\varphi_2^2},$$

wherein, $L_1$ is a measured value of the redundant interferometer; $L_2$ is a measured value of the interferometer installed in the X direction; $S_1$ is a measured value of the first interferometer installed in the Y direction; S2 is a measured value of the second interferometer installed in the Y direction; d is an installation distance in the Y direction between the redundant interferometer and the interferometer installed in the X direction; r is an installation distance in the X direction between the first interferometer and the second interferometer installed in the Y direction; x is a displacement of the motion stage along the X axis of the coordinate system; y is a displacement of the motion stage along the Y axis of the coordinate system; $\theta_z$ is a rotational displacement of the motion stage around the Z axis of the coordinate system; $a_1$, $b_1$ and $b_2$ are intermediate variables; $\eta_1$ is an installation error angle between the interferometer installed in the X direction and the X axis of the coordinate system; $\phi_1$, is an installation error angle between the first interferometer installed in the Y direction and the Y axis of the coordinate system; and $\phi_2$ is an installation error angle between the second interferometer installed in the Y direction and the Y axis of the coordinate system;
3) continuously moving, by the motion stage (1), three points, P1=($x^1$, $y^1$, $\theta_z^1$), P2=($x^2$, $y^2$, $\theta_z^2$), and P3=($x^3$, $y^3$, $\theta_z^3$), wherein $x^1$, $x^2$, and $x^3$ are displacements of the points P1, P2 and P3 in the X-axis direction of the coordinate system; $y^1$, $y^2$, and $y^3$ are displacements of the points P1, P2 and P3 in the Y-axis direction of the coordinate system; and $\theta_z^1$, $\theta_z^2$, and $\theta_z^3$ are rotational displacements of the points P1, P2 and P3 around the Z-axis direction of the coordinate system; and obtaining, by the multi-axis laser displacement measurement system, measured values of the interferometers installed in the X and Y directions and the redundant interferometer at corresponding points, respectively, and forming an equation set as follows:

$$\begin{cases} x^1 = \frac{L_1^1 + L_2^1 a_1}{2} \\ y^1 = \frac{S_1^1 b_1 + S_2^1 b_2}{2} \\ \theta_z^1 = \frac{L_2^1 a_1 - L_1^1}{d} \\ \theta_z^1 = \frac{S_2^1 b_2 - S_1^1 b_1}{r} \end{cases} \begin{cases} x^2 = \frac{L_1^2 + L_2^2 a_1}{2} \\ y^2 = \frac{S_1^2 b_1 + S_2^2 b_2}{2} \\ \theta_z^2 = \frac{L_2^2 a_1 - L_1^2}{d} \\ \theta_z^2 = \frac{S_2^2 b_2 - S_1^2 b_1}{r} \end{cases} \begin{cases} x^3 = \frac{L_1^3 + L_2^3 a_1}{2} \\ y^3 = \frac{S_1^3 b_1 + S_2^3 b_2}{2} \\ \theta_z^3 = \frac{L_2^3 a_1 - L_1^3}{d} \\ \theta_z^3 = \frac{S_2^3 b_2 - S_1^3 b_1}{r} \end{cases}$$

wherein, $L_1^1$, $L_1^2$, $L_1^3$ are measured values of the redundant interferometer at the three points P1, P2 and P3, respectively; $L_2^1$, $L_2^2$, $L_2^3$, $S_1^1$, $S_1^2$, $S_1^3$, $S_2^1$, $S_2^2$ and $S_2^3$ are measured values of the interferometer installed in the X direction, and the first interferometer and the second interferometer installed in the Y direction at the three points P1, P2 and P3, respectively; and
4) solving, by the multi-axis laser displacement measurement system, the equation set in 3), where the measured values $L_1^1$, $L_1^2$, $L_1^3$, $L_2^1$, $L_2^2$, $L_2^3$, $S_1^1$, $S_1^2$, $S_1^3$, $S_2^1$, $S_2^2$ and $S_2^3$ of the interferometers installed in the X and Y directions and the redundant interferometer, as well as the installation distance d between the redundant interferometer and the interferometer installed in the X direction and the installation distance r between the first interferometer and the second interferometer installed in the Y direction are known quantities, to obtain the installation error angles $\eta_1$, $\phi_1$ and $\phi_2$:

$$\eta_1 = \sqrt{\frac{p_1 - 1}{0.5 p_1 - 2}}, \; \varphi_1 = \sqrt{\frac{q_1 - 1}{0.5 q_1 - 2}}, \; \varphi_2 = \sqrt{\frac{q_2 - 1}{0.5 q_2 - 2}}$$

wherein:

$$p_1 = \frac{S_2^1(S_1^2 L_1^3 - S_1^3 L_1^2) + S_2^2(S_1^3 L_1^1 - S_1^1 L_1^3) + S_2^3(S_1^1 L_1^2 - S_1^2 L_1^1)}{S_2^1(S_1^2 L_2^3 - S_1^3 L_2^2) + S_2^2(S_1^3 L_2^1 - S_1^1 L_2^3) + S_2^3(S_1^1 L_2^2 - S_1^2 L_2^1)}$$

$$q_1 = \frac{d}{r} \frac{S_2^1(L_2^3 L_1^2 - L_2^2 L_1^3) + S_2^2(L_2^1 L_1^3 - L_2^3 L_1^1) + S_2^3(L_2^2 L_1^1 - L_2^1 L_1^2)}{S_2^1(S_1^2 L_2^3 - S_1^3 L_2^2) + S_2^2(S_1^3 L_2^1 - S_1^1 L_2^3) + S_2^3(S_1^1 L_2^2 - S_1^2 L_2^1)}$$

$$q_2 = \frac{d}{r} \frac{S_1^1(L_2^3 L_1^2 - L_2^2 L_1^3) + S_1^2(L_2^1 L_1^3 - L_2^3 L_1^1) + S_1^3(L_2^2 L_1^1 - L_2^1 L_1^2)}{S_2^1(S_1^2 L_2^3 - S_1^3 L_2^2) + S_2^2(S_1^3 L_2^1 - S_1^1 L_2^3) + S_2^3(S_1^1 L_2^2 - S_1^2 L_2^1)}.$$

2. The method of claim 1, wherein the interferometer comprises a laser interferometer.

\* \* \* \* \*